(12) United States Patent
Lannutti et al.

(10) Patent No.: US 8,439,781 B2
(45) Date of Patent: May 14, 2013

(54) RADIAL DAMPING MECHANISM AND USE FOR BELT TENSIONING

(75) Inventors: Anthony E. Lannutti, Fayetteville, AR (US); Joshua J. B. Ferguson, Springdale, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 176 days.

(21) Appl. No.: 12/820,400

(22) Filed: Jun. 22, 2010

(65) Prior Publication Data

US 2011/0312455 A1    Dec. 22, 2011

(51) Int. Cl.
*F16H 7/12*    (2006.01)

(52) U.S. Cl.
USPC .......................................................... 474/135

(58) Field of Classification Search .................. 474/133, 474/134, 135, 109, 115, 117, 138
See application file for complete search history.

(56) References Cited

U.S. PATENT DOCUMENTS

| | | |
|---|---|---|
| 4,270,906 A | 6/1981 | Kraft et al. |
| 4,473,362 A | 9/1984 | Thomey et al. |
| 4,583,962 A | 4/1986 | Bytzek et al. |
| 4,596,538 A | 6/1986 | Henderson |
| 4,661,087 A | 4/1987 | Henderson |
| 4,826,471 A | 5/1989 | Ushio |
| 4,832,665 A | 5/1989 | Kadota et al. |
| 4,878,885 A | 11/1989 | Brandenstein et al. |
| 5,411,122 A | 5/1995 | Uphaus |
| 5,558,370 A | 9/1996 | Behr |
| 5,598,913 A | 2/1997 | Monahan et al. |
| 5,632,697 A | 5/1997 | Serkh |
| 5,647,813 A | 7/1997 | Serkh |
| 5,692,482 A | 12/1997 | Shimizu et al. |
| 5,772,549 A | 6/1998 | Berndt et al. |
| 6,231,465 B1 | 5/2001 | Quintus |
| 6,361,459 B1 | 3/2002 | Serkh et al. |
| 6,375,588 B1 | 4/2002 | Frankowski et al. |
| 6,422,962 B1 | 7/2002 | Lehtovaara et al. |
| 6,464,604 B1 | 10/2002 | Frankowski et al. |
| 6,478,118 B2 | 11/2002 | Astrom et al. |

(Continued)

FOREIGN PATENT DOCUMENTS

| | | |
|---|---|---|
| WO | 2004/109247 | 12/2004 |
| WO | 2007/106971 | 9/2007 |

OTHER PUBLICATIONS

PCT, International Search Report and Written Opinion, International Application No. PCT/US2011/039544 (Oct. 11, 2011).

*Primary Examiner* — Michael Mansen
*Assistant Examiner* — Mark K Buse
(74) *Attorney, Agent, or Firm* — Thompson Hine L.L.P.

(57) ABSTRACT

A tensioner for an endless power transmitting element in a drive system is disclosed that includes an arm rotatable about an axis and having a sleeve that includes a ramp face or contoured face, a damper cup having a protrusion and a plate, a spring case that houses the sleeve of the arm and the damper cup with the damper cup's plate mated with the ramp face or contoured face of the sleeve. During wind-up of the tensioner, a normal force is applied to the damper cup's protrusion that moves the plate along the ramp face or contoured face in a first direction, and in the first direction the ramp face or contoured face pushes the damper cup generally radially outward into the spring case to provide frictional damping.

31 Claims, 6 Drawing Sheets

U.S. PATENT DOCUMENTS

| | | |
|---|---|---|
| 6,554,318 B2 | 4/2003 | Kohut et al. |
| 6,582,332 B2 | 6/2003 | Serkh |
| 6,609,988 B1 | 8/2003 | Liu et al. |
| 6,834,631 B1 | 12/2004 | Blackburn et al. |
| 6,863,631 B2 | 3/2005 | Meckstroth et al. |
| 7,004,863 B2 * | 2/2006 | Serkh et al. .................. 474/109 |
| 7,104,909 B2 | 9/2006 | Asbeck et al. |
| 7,229,374 B2 | 6/2007 | Meckstroth et al. |
| 7,371,199 B2 | 5/2008 | Joslyn |
| 7,497,794 B2 * | 3/2009 | Lannutti et al. .............. 474/135 |
| 7,678,002 B2 * | 3/2010 | Joslyn .......................... 474/135 |
| 2003/0008739 A1 | 1/2003 | Asbeck et al. |
| 2003/0119615 A1 | 6/2003 | Meckstroth et al. |
| 2003/0153421 A1 | 8/2003 | Liu |
| 2003/0216204 A1 * | 11/2003 | Serkh et al. .................. 474/135 |
| 2005/0059518 A1 | 3/2005 | Joslyn |
| 2005/0096168 A1 * | 5/2005 | Serkh et al. .................. 474/135 |
| 2006/0100049 A1 | 5/2006 | Lannutti et al. |
| 2006/0293135 A1 * | 12/2006 | Quintus et al. ............... 474/135 |
| 2007/0142148 A1 * | 6/2007 | Joslyn et al. .................. 474/135 |
| 2007/0249446 A1 * | 10/2007 | Hao et al. ..................... 474/135 |
| 2011/0015016 A1 * | 1/2011 | Serkh ........................... 474/135 |
| 2011/0015017 A1 * | 1/2011 | Serkh ........................... 474/135 |

* cited by examiner

RADIAL DAMPING MECHANISM AND USE FOR BELT TENSIONING

TECHNICAL FIELD

The present invention relates generally to a damping mechanism for tensioners for a drive belt system and more particularly to an asymmetrically damped tensioner utilizing a damping mechanism having ramped or contoured features.

BACKGROUND

Belt tensioners use a system or mechanism to dampen tensioner movement which minimizes steady state vibrations or transient events that cause belt slip. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occurs as a result of manufacturing variation, operating temperature and component break-in or wear can also cause the tensioner to be unresponsive.

Damping derived by sliding friction is common among belt tensioners. One particular method involves friction between two surfaces that are perpendicular to the tensioner axis of rotation as in U.S. Pat. No. 4,661,087 to Henderson. The first surface is attached to the tensioner base; the second rotates with the tensioner arm. A spring forces the surfaces together and damping friction is created when the two surfaces slide relative to each other.

Other solutions use wedges that increase damper friction during wind-up, for example U.S. Pat. No. 6,361,459, U.S. Pat. No. 4,878,885, and U.S. Pat. No. 6,863,631, or spring loaded self-energizing brake shoe elements, for example U.S. Pat. No. 6,231,465, U.S. Pat. No. 6,582,332, and U.S. Pat. No. 6,609,988. These designs, however, tend to be complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other belt tensioner proposals include, for example U.S. Pat. No. 5,692,482, U.S. Pat. No. 4,832,665, and U.S. Pat. No. 6,375,588, use of a one-way device coupled to a viscous damper. Although these devices offer good functionality, retention of the viscous fluid throughout the service life can be difficult. Yet another design disclosed in U.S. Patent App. Publication 2003/0008739 that uses friction generated by the clamping action of a wrap spring clutch to provide damping.

Most friction dampers provide equal resistance to motion regardless of the direction of tensioner movement. However, tensioner damping that is unequal, or asymmetric, has been shown to provide superior control of tensioner arm movement compared to typical symmetric systems. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip, or simply making the tensioner less sensitive to damping variation makes it a desirable design option.

The aforementioned damping mechanisms and tensioner designs are not ideal. Accordingly, a new damping mechanism and tensioner design is desired.

SUMMARY

One aspect disclosed herein is a tensioner for an endless power transmitting element in a drive system that includes an arm rotatable about an axis and having a sleeve that includes a ramp face or contoured face, a damper cup having a protrusion and a plate, a spring case that houses the sleeve of the arm and the damper cup with the damper cup's plate mated with the ramp face or contoured face of the sleeve. During wind-up of the tensioner, a normal force is applied to the damper cup's protrusion that directs the damper cup outward into the spring case to provide frictional damping.

In another embodiment, the damper cup is elastic and the protrusion is deflectable to elongate the damper cup to move the plate along the ramped face or contoured face in response to the normal force.

In another aspect, the arm of the tensioner also includes an arm arbor or outer sleeve that is concentric about the inner sleeve and connected to the inner sleeve by a base. The arm arbor has an open end opposite the base and a passage in a portion of the side and base thereof that is sized to receive the damper cup.

In another embodiment, the tensioner includes an arm rotatable about an axis and a damper cup. The arm has a first end including an inner sleeve that includes a ramp face or a contoured face and an outer sleeve including an opening therein, and including a second end that has a pulley for engaging a power transmitting element. The damper cup is received in the opening in the outer sleeve of the arm and includes a protrusion and a plate. The plate of the damper cup is mated with the ramp face or contoured face of the inner sleeve such that when the tensioner arm rotates during wind-up, the rotation of the arm directs the damper cup outward to provide asymmetric frictional damping.

In another aspect, the tensioner includes a spring case having a generally central shaft about which the arm rotates. The inner sleeve of the arm has a bore for receiving the shaft of the spring case such that the arm can rotate about the shaft. The inner sleeve fits loosely over the shaft so the arm is free to float on the shaft. The floating arm is movable about the shaft such that during wind-up the arm is movable away from the damper cup in response to at least a normal force applied to the protrusion of the damper cup. The floating arm may be moved into frictional contact with the spring case for additional frictional damping.

In an embodiment having the floating arm, during wind-up, the pulley at the second end of the arm has an increased hub load. To balance the increased hub load, the damper cup and the floating arm are oriented within the spring case in the direction of the hub load.

DETAILED DESCRIPTION

The following detailed description will illustrate the general principles of the invention, examples of which are additionally illustrated in the accompanying drawings. In the drawings, like reference numbers indicate identical or functionally similar elements.

The damping mechanism and tensioner disclosed herein provide the tensioner with asymmetric frictional damping. The tensioner is typically part of a power system where the tensioner provides tension to an endless power transmitting element such as a belt, chain, or other continuous loop in a system driven by at least one source and that also drives at least one accessory. The endless power transmitting element and the tensioner operate in concert with the tensioner providing tension to the power transmitting element as needed and responding to dynamic conditions thereof.

Figure 1:
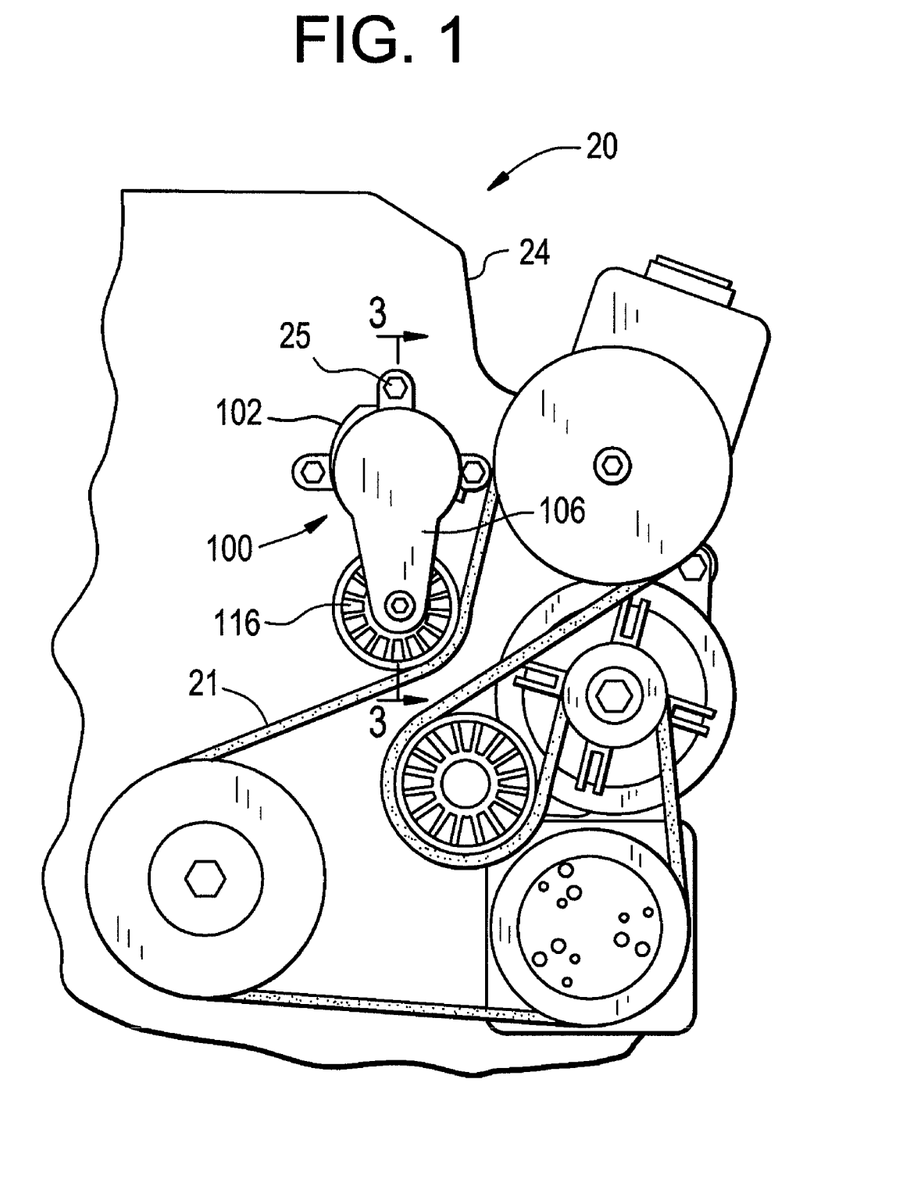
FIG. 1 is a front view of an engine which utilizes an embodiment of the new tensioner.

Referring now to FIG. 1, an engine is generally indicated by the reference numeral 20 and utilizes an endless power transmitting element 21 for driving a plurality of driven accessories as is well known in the art. The belt tensioner of this invention, generally designated as 100, is utilized to provide a tensioning force on the endless power transmitting element 21 in the manner described below. The endless power transmission belt 21 may be of any suitable type known in the art. The tensioner 100 is configured to be fixed to a mounting bracket or support structure 24 of the engine 20 by a plurality of fasteners 25. The fasteners may be bolts, screws, welds, or any other suitable fastener known in the art that will hold the tensioner in place during operation of the engine. The mounting bracket or supporting structure 24 may be of any configuration and include any number of openings for receiving the fasteners 25.

Tensioning a slack power transmitting element is an unwinding of a wound-up tensioner which will be referred to herein as the tensioning direction T. In the opposite direction, referred to herein as the winding direction W, a winding up of the tensioner occurs in response to a prevailing force of the power transmitting element which is tightening in the span where the tensioner resides. The winding of the tensioner may have some potentially deleterious effects, so to mitigate these effects it is desirable to have a damper, for example a frictional damper, incorporated in the tensioner to resist the movement of the power transmitting element without adversely affecting movement of the tensioner, in particular its arm to tension the power transmitting element. This kind of frictional damping is generally known as asymmetric damping.

The damping mechanism and belt tensioner disclosed herein achieves asymmetric damping in part by using a brake element, which may be referred to herein as a ramp-ramp assembly. The ramp-ramp assembly may be comprised of at least two tensioner components having ramp or contoured features that interface with each other. Here, the ramp-ramp assembly provides an outwardly directed force that creates radial frictional damping between components of the damping mechanism and/or belt tensioner.

At least one of the tensioner components having a ramp or contoured feature is moveable such that one-way or asymmetric frictional damping, i.e., progressively more frictional damping, is provided to oppose the movement of the tensioner arm when the arm begins to move away from the belt. The ability to progressively increase frictional damping relative to displacement of the tensioner arm enables the device to provide greater frictional damping in response to greater displacements of the tensioner arm in the winding direction W. This creates a feedback loop to combat the potential deleterious effects of wind-up; the more the tensioner arm is rotated in the winding direction, the more frictional damping is applied to stop the wind-up. The asymmetric damping may be tailored such that it will not restrict all movement in the wind-up direction thereby providing additional compliance that is advantageous for some applications. Since the damping is asymmetric in nature by design, as the tensioner returns to normal operation, the amount of frictional damping applied to the motion of the device in the tensioning direction is less than that applied during wind-up.

Figure 2:
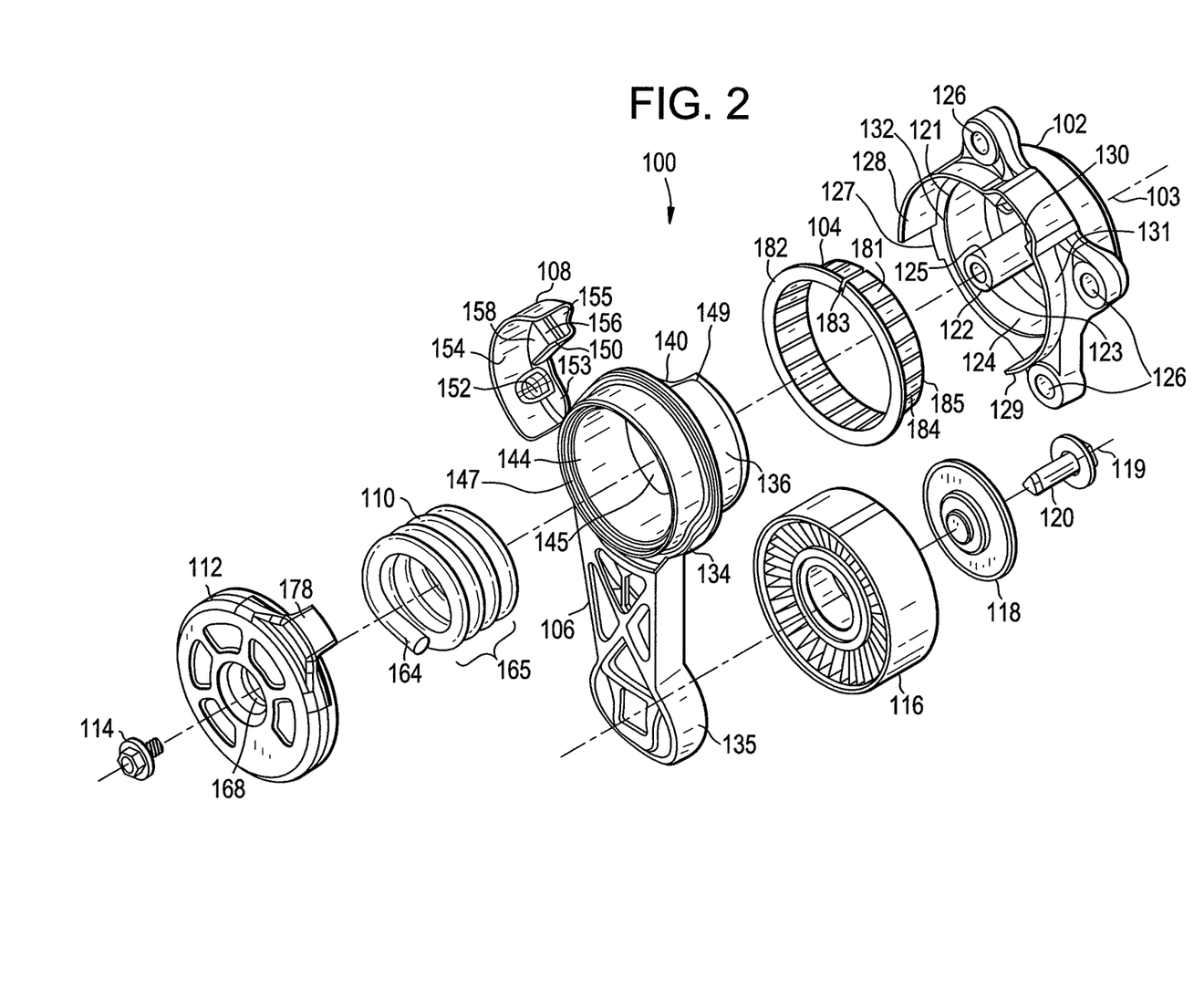
FIG. 2 is an exploded perspective view of an embodiment of the tensioner including a damper cup.
Figure 3:
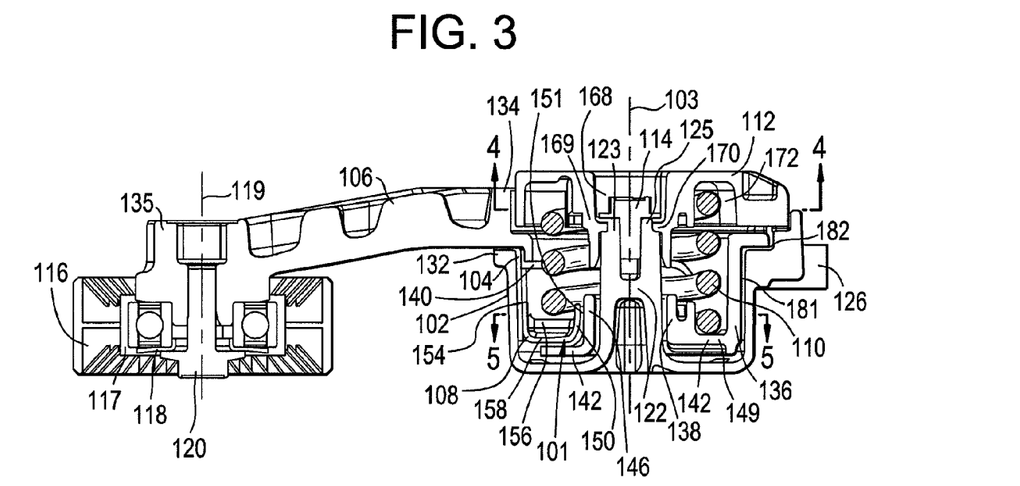
FIG. 3 is a side, cross-sectional view of the tensioner of FIG. 1 taken along line 3-3.
Figure 4:
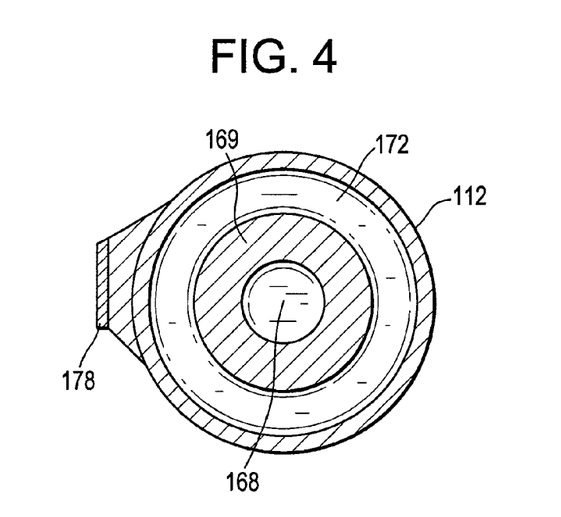
FIG. 4 is a plan view, in section, along line 4-4 in FIG. 3.
Figure 5:
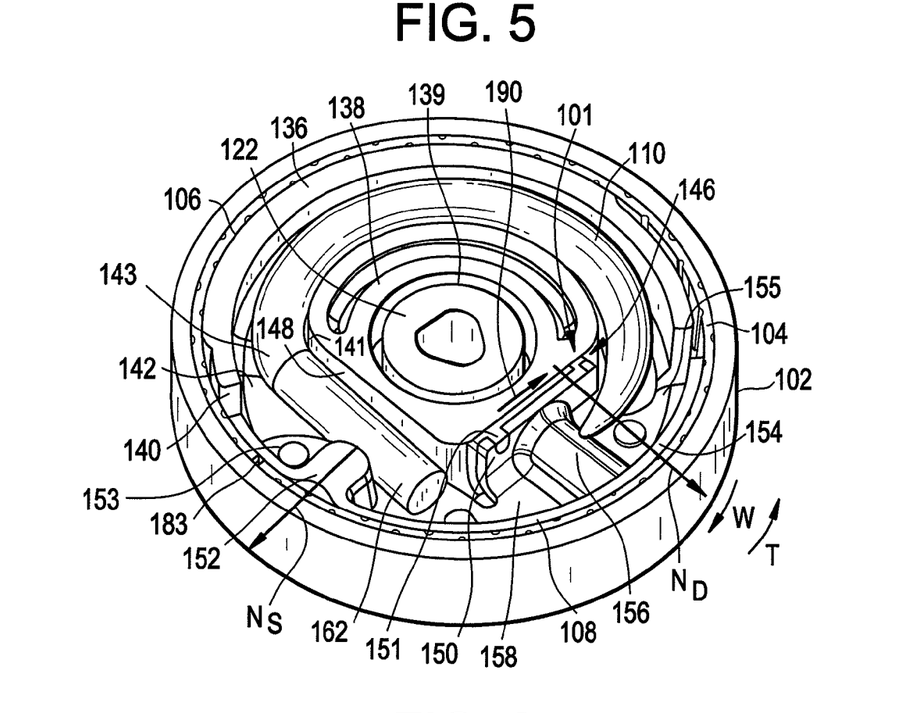
FIG. 5 is perspective view, in section, along line 5-5 in FIG. 3.
Figure 6:
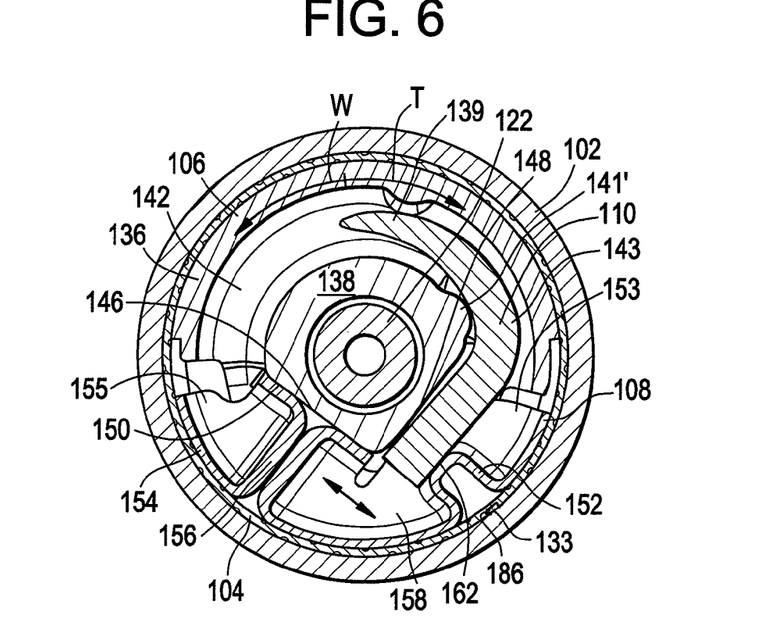
FIG. 6 is an alternate configuration as a plan view, in section, along line 5-5 in FIG. 3.

Referring now to the embodiment depicted in FIGS. 1-5, the belt tensioner 100 achieves asymmetric damping in part by the use of a ramp-ramp assembly 101 (FIGS. 3, 5-6). Belt tensioner 100 includes a spring case 102, a bushing 104, a tensioner arm 106 having an arm arbor or outer sleeve 136 and an inner sleeve 138, a damper cup 108, a torsion spring 110, and a cap 112 assembled at the first end 134 of the tensioner arm 106. At the second end 135, the tensioner arm 106 includes a pulley 116 having a bearing 117, a cover 118, and a pulley fastener 120 mounting the pulley thereto to rotate about the pulley axis 119.

Spring case 102 is configured to receive components of the belt tensioner and facilitates mounting the belt tensioner 100 in place relative to the belt to be tensioned. The spring case 102 defines a spring cavity 121 including a sidewall 124 that receives at least spring 110, bushing 104, damper cup 108, and at least a portion of the outer sleeve 136 and attached inner sleeve 138. The spring case 102 includes a pivot shaft or journal 122 that extends into the spring cavity 121 and defines an axis of rotation 103 about which the tensioner arm 106 rotates. The shaft 122 is generally disposed in the center of the spring cavity 121. The exposed end 125 of shaft 122 may include a mounting base 123 that may be splined or otherwise configured to mate with a bore 168 in cap 112.

Spring case 102, as shown in FIG. 2, includes mounts 126 that may include openings for the introduction of fasteners to mount the tensioner to a mounting surface. The fasteners may be screws, bolts, rivets, pins, etc. While mounting with a fastener is shown, alternate methods of affixing a tensioner relative to a belt to be tensioned are well known in the art including, but not limited to, the use of welds, locking structures, and an axle passing through the tensioner along the pulley axis 119. Regardless of the method of mounting the device to an engine or other device, the approaches taken to create the asymmetric forces to combat wind-up are substantially unchanged.

Sidewall 124 of the spring case 102 may include an aperture 127 that is open to receive the tensioner arm 106. The aperture 127 is generally wider than the tensioner arm 106 to allow the arm a range of rotational movement. The first end 128 and the second end 129 of the sidewall 124 that define the aperture may act as stops to keep the arm from over winding the spring 110 in one direction while alternately stopping the arm in the opposite direction in the event of over rotation, for example if the belt breaks.

Spring case 102 may include a flange or rim 131 configured to mate with or seat the arm 106 and/or the cap 112 there-against or therein when assembled. Spring case 102 may also include a slot 130 in the rim 131 or the sidewall 124 that is open to receive a tab 178 extending from the cap 112. Upon assembly, slot 130 receives tab 178. A fastener 114, such as a bolt, may be received in bore 168 of the cap 112 to connect the cap to the exposed end 125 of the shaft 122 to hold the assembled tensioner together. As appreciated by one skilled in the art, the fastener 114 may also be a screw, pin, rivet, or other fasteners capable of holding the parts of the tensioner in the assembled position.

Bushing 104 is a substantially cylindrical sleeve 181 having an upper end 184 and a lower end 185. The bushing 104 may include a flange 182 extending radially outward from the upper end 184 of the sleeve 181. The bushing 104 may also have a slit 183 extending parallel to the axis 103 along the length of the sleeve 181 for ease of assembly as well as providing the bushing with some flexibility.

In one embodiment, the bushing 104 may be keyed to the spring case 102 such that relative motion can only be achieved between the damper cup 108 and the cylindrical sleeve 181 of the bushing (i.e., the bushing is non-rotatable). Referring to FIG. 6, the bushing 104 may include a slot 186 that receives a key 133 protruding from the inner surface of the spring case 102. Alternately, the spring case 102 may have the slot and the bushing may have the key. While the keyed relationship is illustrated as a slot and a mating protrusion, one skilled in the art will appreciate that any configuration that mates the bushing to the spring case so that the bushing is substantially non-rotatable is suitable. The bushing provides one mechanism to dampen sound and/or vibration.

Upon assembly, the bushing 104 is inserted into the spring case 102 adjacent the sidewall 124 to provide a bearing surface for the rotation of elements of the belt tensioner 100 about shaft 122 and axis 103. Bushing 104 may be disposed between the spring case 102 and the outer sleeve 136 (FIG. 3). The flange 182 may be disposed between a portion of the spring case, such as shoulder 132, and the arm. The flange 182 may be continuous or discontinuous and may include a feature such as a ridge projecting from its upper or lower surface for mating with a groove on the arm or the lip of the spring case.

Tensioner arm 106 includes an outer sleeve 136 at its first end 134. The outer sleeve 136 extends generally downward from the arm and defines a housing 145 with an open end 144 and an at least partially closed end 149. To define the at least partially closed end 149 of the outer sleeve, the outer sleeve 136 has a base 142 extending radially inward from a portion of the circumference outer sleeve 136 toward the center of the partially closed end 149 that then transitions upward into an inner sleeve 138 that extends into the housing 145. The outer sleeve 136 also includes an aperture 140 sized to receive the damper cup 108. The passage 140 may extend partially around the outer sleeve 136 and partially into the base 142.

The inner sleeve 138 of the arm 106 defines a bore 139 that receives the shaft 122 for rotation of the arm 106 about the shaft. The bore 139 is dimensionally larger than the shaft 122 such that the arm 106 is a floating arm. The floating arm 106 is not rigidly fixed to the shaft, but is free to shift radially about the shaft in response to forces acting upon the tensioner. In particular, the arm is free to shift generally away from the damper cup 108 during wind-up. When the arm shifts away from the damper cup it moves the outer sleeve 136 into frictional contact with the sidewall 124 of the spring case 102 and/or the damper bushing 104.

Figure 7:
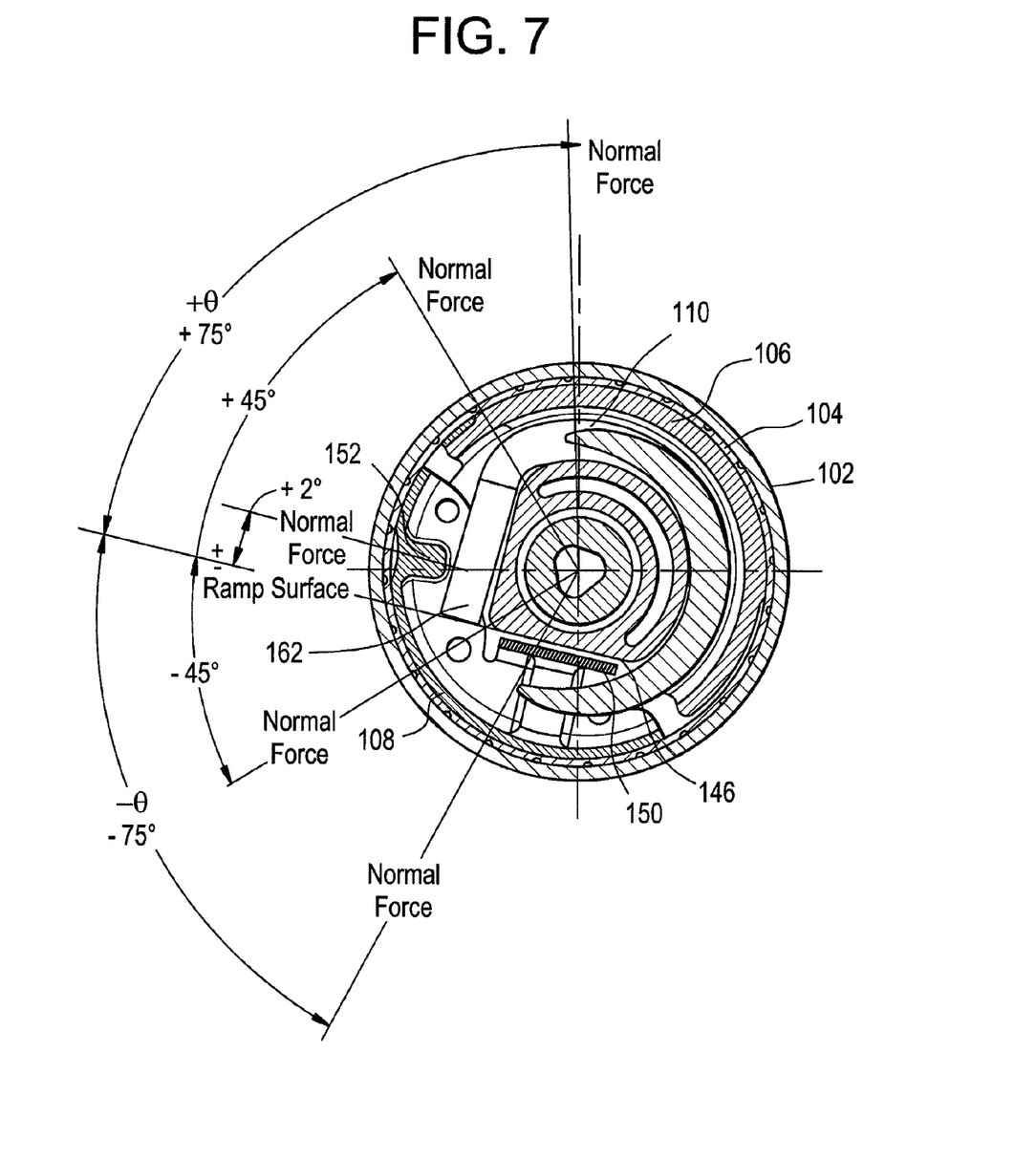
FIG. 7 is a top view of FIG. 6 illustrating the relative angles ±θ.

The inner sleeve 138 includes a ramp face 146 on the exposed exterior surface of the sleeve that faces the passage 140 that receives the damper cup 108. The ramp face 146 may have a pre-determined angle that provides a maximum amount of frictional damping. The ramp face 146 is angled to engage a mating ramp feature on the damper cup 108. In one embodiment, the incline or slope of the ramp face is inline with the directional force of the spring. The relative angle θ between the ramp feature and the directional force of the spring can range between about ±75°, more preferably between about ±45°. FIG. 7 illustrates the relative angles +θ and −θ measured between the ramp face 146 and the normal force that the spring applies, in particular the spring end 162, to or on the damper cup 108. In one embodiment, the relative angle is about +2°. Adjacent to the ramp face 146 is a spring face 148 that is configured to receive a first end 162 of the torsion 110 there against.

Figure 8:
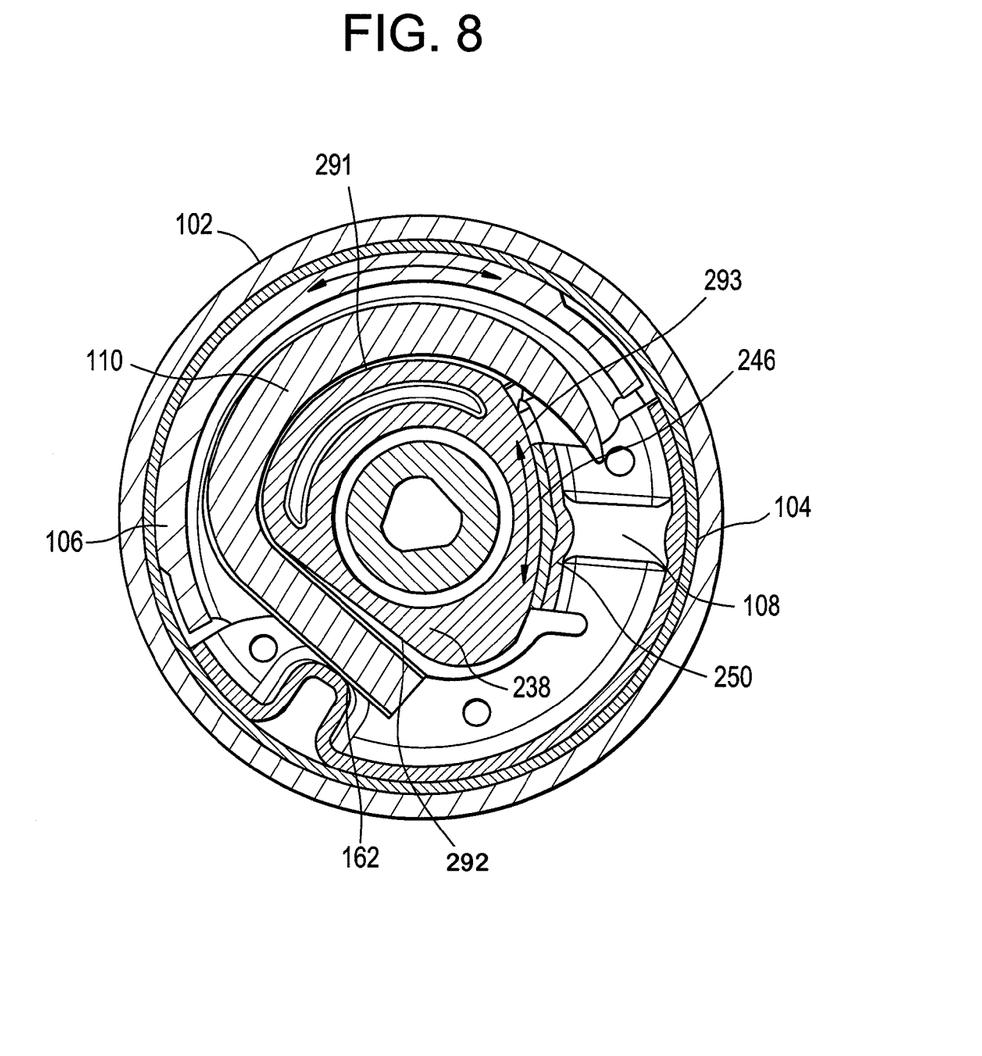
FIG. 8 is a top view, in section, of a tensioner having an inner sleeve with a contoured face, wherein the section was taken along a line similar to line 5-5 illustrated in FIG. 3.

In another embodiment, the embodiment of FIG. 8, the inner sleeve, generally designated as 238, rather than having a generally planar ramp face 146 instead has a contoured face 246. The contoured face 246 may have the outer contour of generally a half of a tear drop when viewed in cross-section or any other generally elliptical contour. In one embodiment, the inner sleeve 238 of the arm 106 is cammed on at least a portion of the exterior surface of the sleeve 238 that mates with the damper cup's 108 plate, generally designates as 250 in this embodiment. As illustrated in FIG. 8, the exterior surface of the inner sleeve 238 includes a generally circular curved portion 291 that is curved to provide a seat for the coils of the spring 110, a generally planar portion 292 that is a seat for the first end 162 of the spring, and a cammed portion 293 that has a generally elliptical curvature. The cammed portion 293 seats or mates against the plate 250 of a damper cup 108. In this embodiment, the plate 250 has a contour that is appropriately shaped to mate against the cammed portion 293 of the inner sleeve 238. Applicants believe that the contoured face 246 may be advantageous because this embodiment is less dependent upon the frictional characteristic between the components of the tensioner to move the damper cup 108 to provide asymmetric damping.

Referring to FIGS. 2-5, the damper cup 108 is generally a partial C-shaped configuration that fits into the passage 140 of the outer sleeve 136. The damper cup 108 includes a generally C-shaped back 154, a bottom 158 extending the length of the back 154, and a plate 150 extending up from the inner edge of the bottom 158 opposite a portion of the back 154 and connected to the back 154 by a support 156. The damper cup 108 has a first end 153 and a second end 155. The first end 153 of the damper cup 108 includes the plate 150. The plate 150 like the ramp face 146 has an inclined or sloped surface or face. The surface of the ramped plate 150 is angled such that it complements the angle of the ramp face 146 such that the two surfaces or faces are mateable. When the plate 150 is mated to the ramp face 146, the inclines are oppositely angled such that the plate 150 is essentially mated against a 180° rotation of its mirror image.

The plate 150 may include a ramp pad 151. The ramp pad 151 can be advantageous in that it may comprise a material that provides a lower coefficient of friction between the plate and the surface it is in contact with, such as the ramp face 146 of inner sleeve 138, which can prevent the ramp face 146 and the plate 150 from wearing unevenly, prematurely, or wearing grooves into one another. The ramp pad 151 may also provides a more stable coefficient of friction between the ramp face 146 and the plate 150, thereby maintaining a more consistent asymmetry ratio throughout the life of the belt tensioner. In an alternate embodiment the ramp face 146 or the plate 150 may be coated or otherwise treated in order to minimize the ramp-ramp interface friction. Specific methods of achieving this goal can include pads or coatings of suitable materials known to one of skill in the art. For example, metallic, ceramic, and or plastic materials, including, but not limited to, brass, aluminum, oil impregnated bronze, silicon nitride, Teflon® (polytetrafluoroethylene—PTFE), ultra high molecular weight polyethylene (UHMWP), or high density polyethylene. These materials may form the entire ramp feature or be applied to a substrate or structural materials in order to achieve specific load bearing and friction characteristics.

The second end 155 of the damper cup 108 includes a protrusion 152 protruding inward that will be positioned opposite the spring face 148 of the inner sleeve 138 when assembled. The damper cup 108 only receives the first end 162 of the spring 110 (it does not house or retain a portion of the core 165) and retains the first end 162 between the protrusion and the spring face 148 of the inner sleeve 138. The protrusion 152 may be a generally curved protrusion that is a continuous part of the generally C-shaped back 154 as best seen in FIG. 6.

In one embodiment, the damper cup 108 is expandable such that when a normal force presses $N_S$ (FIG. 5), applied by the spring 110 through the first spring end 162, is applied against the protrusion 152 the force deforms the protrusion thereby spreading the generally C-shaped back 154 of the damper cup 108 apart at the site of the protrusion and lengthening the damper cup toward the second end 155. The lengthening of the damper cup 108 moves the plate 150 along the ramp face as illustrated in FIG. 5 by arrow 190. When the normal force is removed from protrusion 152, the protrusion will return to its original shape, thereby moving the plate 150 in the opposite direction of arrow 190 and back toward its original position as the damper cup returns to its original shape. One advantage to this design is that only one damper cup is needed, thus fewer parts to manufacturer which not only saves time and money, but also means less parts for potential mechanical wear.

In an alternate embodiment, the damper cup 108 is of a more rigid design and is not expandable. The rigidity of the cup (or its flexibility) may be a function of the materials used and/or the shape of the cup 108 and the protrusion 152. In the more rigid embodiment, the damper cup 108 uses the frictional torque between the spring case 102 (and bushing 104) and the arm 106 to advance itself up the ramp face 146 or contoured face 246 when urged by the spring 110 during wind-up.

As shown in FIG. 3, when assembled, the damper cup 108 is received in the passage 140 of the outer sleeve 136 such that the plate 150 is in contact with the ramp face 146 of inner sleeve 138. The damper cup 108 and outer sleeve 136 are disposed within the spring case 102 adjacent to the bushing 104 and with the inner sleeve 138 fitted over shaft 122 for rotation of the arm relative thereto. Spring 110 is then received within the outer sleeve 136.

The features describe above for the damper cup 108 are likewise applicable to damper cup 208 of FIG. 8.

Torsion spring 110 may be a coil spring, a round wire spring, a flatwire spring, or other spring types known to one of skill in the art. As shown in FIGS. 2, 4 and 5, the torsion spring 110 includes a first end 162, a second end 164, and a core 165 defined by the coils of the spring. Once assembled, FIG. 5 shows that the first end 162 of torsion spring 110 engages the tensioner arm 106 and the damper cup 108. The first end 162 lies between the spring face 148 of the inner sleeve 138 and the protrusion 152 of damper cup 108. The first end 162 is generally the length of the spring face 148 so the spring aligns itself within the spring cavity 121. FIG. 4 shows a spring groove 172 within cap 112 that receives the second end 164 of the torsion spring 110 so the spring can be coupled to or engage the cap 112. As best seen in FIG. 3, the torsion spring 110 extends through the outer sleeve 136 and is received in the cap 112 with the lower portion of the core 165 of the spring wrapped around the inner sleeve 138 of the outer sleeve and the main portion of the core 165 housed in the outer sleeve 136.

Torsion spring 110 provides a torsional force to bias the tensioner arm 106 into the belt being tensioned to tension the belt during normal operations. The torsion spring 110 also provides the normal force $N_S$ that is applied to the protrusion 152 of the damper cup 108, which moves or urges the plate 150, 250 to move up the ramp face 146 or contoured face 246 of inner sleeve 138, 238.

In one embodiment, the inner sleeve 138 of the arm 106 includes a rounded corner 141 (FIG. 5) and, in an alternate embodiment, a nub 141' (FIG. 6) adjacent the spring face 148 but on the opposite side from the ramp face 146. The rounded corner 141 or nub 141' is positioned where it can contact the first bend 143 of the torsion spring that is contiguous with the first end 162 of the spring. The nub 141 is preferably a protruding rounded or curved shape for better contact with the first bend 143. The rounded corner 141 and the nub 141' both provide a second point of contact for the forces in the tensioner to operate on the inner sleeve 138 to move the arm 106 for increased frictional damping during wind-up. The ramp face 146 of the inner sleeve provides the first point of contact.

During wind-up, the winding of the torsion spring 110 pushes the first end 162 of the spring outward into the protrusion 152 while at the same time pushing the first bend 143 into the rounded corner 141 or the nub 141'. Since the arm 106 is a floating arm, the arm moves in response to the first bend 143 of the spring pushing against the rounded corner 141 or the nub 141', which shifts the arm toward the sidewall 124 of the spring cavity 102 generally opposite the damper plate 108 for frictional damping therebetween.

Cap 112 includes a tab 178, a boss 169 extending from the underside of the cap that defines bore 168, and a spring groove 172. Boss 169 may have a shaft seat 170 within the bore 168 that mates with the mounting base 123 of shaft 122. The spring groove 172 may include a channel, notch, slit, hook, strap, tie, or other means of securing the second end of the torsion spring.

Upon assembly, the cap 112 is received in the open end 144 of the outer sleeve 136 with tab 178 received in slot 130 on the spring case 102 and boss 169 fit partially over the exposed end 125 of shaft 122 such that the seat 170 is seated upon mounting base 123. As seen in FIG. 3, the cap 112 may be recessed in the open end 144 of the outer sleeve 136. The cap 112 preferably includes a secondary seal between the arm 106, for example, should 147 in the open end 144 of the arm 106 and the cap 112. The secondary seal may be a labyrinth seal or a seal ring such as a "V" or "X" ring.

A fastener 114 is received in bore 168 of the cap 112 to connect the cap to the shaft 122. The cap 112 may also be connected by other means to the shaft 122 such as radial rivet, press fit, and/or swage, and is not limited thereto. The cap 112 closes the open end 144 of the outer sleeve 136 and encloses the components of the belt tensioner within the spring case 102 without rigidly fixing the arm 106 to the shaft. The cap also protects the components from contaminants.

Tensioner arm 106 is rotatable about axis 103 in a tensioning direction T and in a winding direction W as explained above and as shown in FIGS. 5 and 6. FIG. 6 includes the same components as FIGS. 1-4 and therefore has corresponding reference numbers. However, FIG. 5 includes a right-handed damper cup as the ramped plate is on the right and FIG. 6 includes a left-handed damper cup as the ramped plate is on the left. Accordingly, the tensioning direction T and the winding direction W in FIG. 6 are the reverse of those for FIG. 5.

Under normal belt tensioning conditions, as shown in FIGS. 5 and 6, the plate 150 and the ramp face 146 are in contact in a down-ramp position. In this position there is generally little or no frictional force or at least a minimal constant frictional force between the damper cup 108 and the bushing 104 and spring case 102.

Spring 110 is coupled to the tensioner arm 106, damper cup 108, and the cap 112, as described above, such that when the arm rotates in the winding direction W the spring is wound and the first end 162 of the spring moves outward and applies an outwardly directed normal force ($N_S$) to the protrusion 152. This normal force ($N_S$), in an embodiment with a flexible (i.e., expandable) damper cup deforms protrusion 152 spreading the protrusion toward at least the second end 155 of the damper cup, which lengthens the damper cup 108, thereby moving the plate 150 along ramp face 146 in the up-ramp direction 190. As the plate 150 moves up the ramp face 146, the angle of the ramp face 146 applies a normal damping force ($N_D$) to the ramped plate and thereby to the back 154 of the damper cup 108 opposite the plate 150 to direct the back 154 outward into the bushing 104 and the spring case 102 for friction therebetween. The second end 155 of the damper cup 108 is therefore wedged into or against the bushing 104 and spring case 102 in an up-ramp position to provide radial frictional damping. The ramped plate/ramp face assembly described herein provides a more constant force to the frictional surfaces for improved radial frictional damping.

Once the belt lifting the tensioner arm in the untensioning direction relaxes, the wound spring provides torque that rotates the tensioner arm back against the belt, i.e., in the tensioning direction. As the spring uses its torque to rotate the tensioner arm, the spring unwinds which reduces the normal force ($N_S$) on protrusion 152 allowing the protrusion to gradually return to its original shape as the normal force ($N_S$) decreases. This in turn will reduce the length of the damper cup 108 and gradually return it to its original length, thereby moving the plate 150 down the ramp face 146 to its down-ramp position and reducing and/or removing the normal damping force ($N_D$) such that reduced or generally no frictional damping occurs to resist rotation of the tensioner arm 106 toward the belt.

In an embodiment with a more rigid damper cup 108 design, the normal force ($N_S$) acting on protrusion 152 acts to push the damper cup 108 along the ramp face 146 of the inner sleeve 138 in the direction of arrow 190 (FIG. 5) (the "up-ramp direction"). As the plate 150 moves in the up-ramp direction, the angle of the ramped face 146 applies a normal force ($N_D$) to the plate 150 and thereby to the back 154 of the damper cup 108 opposite the plate 150 to direct the back 154 outward into the bushing 104 and the spring case 102 for friction therebetween, i.e., wedging the damper cup 108 into the bushing 104 and the spring case 102.

Once wind-up stops, the wound spring provides torque that rotates the tensioner arm back against the belt and as the spring unwinds, it reduces the normal force ($N_S$) on protrusion 152 allowing the damper cup 108 to naturally move in the opposite direction of arrow 190 back toward its original position. This reduces the wedging of the damper cup 108 into the bushing 104 and spring case 102, which thereby reduces and/or removes the normal damping force ($N_D$) such that reduced or generally no frictional damping occurs to resist rotation of the tensioner arm 106 toward the belt.

The same damping mechanism is believed to be true for the embodiment of FIG. 8 having the contoured face 246 of the inner sleeve 238. In belt tensioner 100 the magnitude of the normal damping force ($N_D$) is primarily a function of spring torque and the ramp face angle or contour. The spring torque is dictated by the amount of pre-loading, the spring constant, and other well-controlled characteristics of torsion springs known to those of ordinary skill in the art. Accordingly, the spring torque can be determined for the spring selected for the tensioner and will only change slightly to take up clearance or compensate for wear as the ramped plate moves up the ramp face. This provides better damping control throughout the life of the tensioner.

The operation of the belt tensioner 100 and the rate or profile of asymmetric damping can be modulated by changing the characteristics of the ramp face and/or ramped plate, such as the profile (i.e., the angle of the ramp feature), size, structure, and relative friction thereof. Accordingly, the ramp face may be adjusted for accurate control of the radial asymmetric damping. The frictional properties of the ramp-ramp interface may be modulated by, for example, adding specific surface treatments and finishes, structures, pads, and even basic material selection.

The components of the belt tensioner can be fabricated using a variety of techniques including forging, casting, die-casting, sintering, or machining or fabricated in different components, or other techniques known to one of ordinary skill in the art and then joined together using a variety of methods such as sintering, welding, bonding, bolting, and even interference fits or other methods known to one of ordinary skill in the art.

The embodiments of this invention shown in the drawing and described above are exemplary of numerous embodiments that may be made within the scope of the appended claims. It is contemplated that numerous other configurations of the tensioner assemblies may be created taking advantage of the disclosed approach. In short, it is the applicant's intention that the scope of the patent issuing herefrom will be limited only by the scope of the appended claims.

What is claimed is:

1. A tensioner for an endless power transmitting element in a drive system comprising:
    an arm rotatable about an axis of rotation, the arm comprising a sleeve that includes a ramp face or a contoured face;
    a damper cup comprising a protrusion and a plate, the plate being slidingly engaged with the ramp face or contoured face of the sleeve such that as the arm rotates, the plate slides along the ramp face or contoured face of the sleeve; and
    a spring case housing the sleeve and the damper cup;
    wherein during wind-up of the tensioner the ramp face or contoured face of the sleeve rotates relative to the plate of the damper cup and a normal force is applied to the protrusion that directs the damper cup outward into the spring case to provide asymmetric frictional damping.

2. The tensioner of claim 1 further comprising a torsion spring within the spring case.

3. The tensioner of claim 2 wherein the sleeve includes a spring face and a first end of the spring lies along the spring face and contacts the protrusion of the damper cup.

4. The tensioner of claim 3 wherein the first end of the spring applies the normal force to the protrusion.

5. The tensioner of claim 1 wherein the arm further comprises an arm arbor concentric about the sleeve, the arm arbor having an opening that receives the damper cup.

6. The tensioner of claim 1 further comprising a bushing between the spring case and the arm arbor.

7. The tensioner of claim 6 wherein the bushing is connected to the spring case so as to be non-rotatable.

8. The tensioner of claim 7 wherein, during wind-up of the tensioner, the damper cup is urged generally radially outward into the bushing.

9. The tensioner of claim 1 wherein the arm is a floating arm.

10. The tensioner of claim 9 wherein the spring case further comprises a pivot shaft, and wherein the sleeve of the arm is rotatable about the pivot shaft.

11. The tensioner of claim 10 wherein the floating arm is moved into frictional contact with the spring case for additional frictional damping.

12. The tensioner of claim 10 further comprising a pulley coupled to the arm at an end opposite the sleeve, wherein the pulley has an increased hub load during wind-up, and the damper cup and the floating arm are oriented within the spring case in the direction of the hub load.

13. The tensioner of claim 1 wherein the damper cup is elongateable and retractable, and the protrusion is deflectable to elongate the damper cup to move the plate along the ramped face or contoured face in response to the normal force.

14. The tensioner of claim 1 wherein the damper cup further comprises a bottom that separates an arcuate back a distance from the plate.

15. The tensioner of claim 14 wherein the plate is connected to the arcuate back by a support.

16. The tensioner of claim 14 wherein the protrusion protrudes from the arcuate back of the damper cup inwardly toward the axis of rotation.

17. A tensioner for an endless power transmitting element in a drive system comprising:
an arm rotatable about an axis, the arm comprising, at a first end thereof, an inner sleeve including a ramp face or a contoured face and an outer sleeve including an opening therein, and, at a second end thereof, a pulley;
a damper cup received in the opening of the outer sleeve, the damper cup comprising a protrusion and a plate, the plate being in frictional contact with the ramp face or the contoured face of the inner sleeve;
wherein rotation of the arm during a wind-up condition of the tensioner rotates the ramp face or contoured face relative to the damper cup thereby applying a normal force to the damper cup that directs the damper cup generally radially outward to provide asymmetric frictional damping.

18. The tensioner of claim 17 further comprising a spring case housing the inner sleeve of the arm, at least a portion of the outer sleeve of the arm, and the damper cup.

19. The tensioner of claim 18 further comprising a torsion spring seated about the inner sleeve of the arm and having a first end seated against the damper cup.

20. The tensioner of claim 19 wherein the inner sleeve includes a spring face, and wherein the first end of the spring lies between the spring face of the inner sleeve and the protrusion of the damper cup.

21. The tensioner of claim 20 wherein the first end of the spring applies the normal force to the protrusion.

22. The tensioner of claim 19 wherein the torsion spring is the main spring.

23. The tensioner of claim 19 wherein the pulley has an increased hub load as the torsion spring is wound, and the damper cup and the arm are oriented within the spring case in the direction of the hub load.

24. The tensioner of claim 18 further comprising a bushing between the spring case and the damper cup.

25. The tensioner of claim 24 wherein the bushing is connected to the spring case so as to be non-rotatable.

26. The tensioner of claim 18 wherein the spring case includes a generally central shaft about which the arm rotates.

27. The tensioner of claim 26 wherein the inner sleeve of the arm includes a bore therethrough received over the shaft; wherein the arm is free to float on the shaft.

28. The tensioner of claim 27 wherein the floating arm is moved away from the damper cup in response to at least the normal force applied to the protrusion of the damper cup during wind-up.

29. The tensioner of claim 28 wherein the floating arm is moved into frictional contact with the spring case for additional frictional damping.

30. The tensioner of claim 17 wherein the outer sleeve of the arm is concentric about the inner sleeve and is connected thereto by a base extending therebetween and bounded by the opening in the outer sleeve.

31. The tensioner of claim 30 wherein the outer sleeve includes an open end opposite the base.

\* \* \* \* \*